(12) United States Patent
Decroix et al.

(10) Patent No.: US 7,966,472 B2
(45) Date of Patent: Jun. 21, 2011

(54) METHOD OF MANAGING A MEMORY INCLUDING ELEMENTS PROVIDED WITH IDENTITY INFORMATION INDICATIVE OF THE ANCESTRY OF SAID ELEMENTS

(75) Inventors: David Decroix, Montreuil (FR); Louis-Philippe Goncalves, Deuil la Barre (FR); Cyrille Pepin, Andresy (FR)

(73) Assignee: Morpho, Paris (FR)

( * ) Notice: Subject to any disclaimer, the term of this patent is extended or adjusted under 35 U.S.C. 154(b) by 367 days.

(21) Appl. No.: 12/303,547

(22) PCT Filed: May 25, 2007

(86) PCT No.: PCT/FR2007/000877
§ 371 (c)(1),
(2), (4) Date: Dec. 31, 2008

(87) PCT Pub. No.: WO2007/141406
PCT Pub. Date: Dec. 13, 2007

(65) Prior Publication Data
US 2010/0005256 A1 Jan. 7, 2010

(30) Foreign Application Priority Data
Jun. 7, 2006 (FR) .................................... 06 05069

(51) Int. Cl.
*G06F 12/00* (2006.01)

(52) U.S. Cl. ................................ 711/206; 711/E12.016

(58) Field of Classification Search .................. 711/206, 711/170, 209, 156, E12.016, E12.017
See application file for complete search history.

(56) References Cited

U.S. PATENT DOCUMENTS
4,758,946 A 7/1988 Shar et al.
6,983,355 B2 * 1/2006 Ripberger et al. ............ 711/206

FOREIGN PATENT DOCUMENTS
WO WO-99/05617 2/1999

OTHER PUBLICATIONS
Comer, Douglas, "The Unbiquitous B Tree," Computing Surveys. Jun. 1979, pp. 121-137, vol. 11—No. 2.

* cited by examiner

*Primary Examiner* — Pierre-Michel Bataille
(74) *Attorney, Agent, or Firm* — Muncy, Geissler, Olds & Lowe, PLLC

(57) ABSTRACT

A method of managing a memory having stored elements that are organized in a hierarchy, each having a header containing individual identity information and a body containing data, the identity information of each element being encoded on a plurality of bits each of which can take a first value or a second value. The identity information of each element is obtained by repeating the identity information of an element constituting a direct antecedent of the element in question in the hierarchy, and in said identity information of the antecedent, by changing the value of a first value bit that follows the last second value bit in a direction for reading the identity information.

4 Claims, 1 Drawing Sheet

METHOD OF MANAGING A MEMORY INCLUDING ELEMENTS PROVIDED WITH IDENTITY INFORMATION INDICATIVE OF THE ANCESTRY OF SAID ELEMENTS

BACKGROUND OF THE INVENTION

1. Field of the Invention

The present invention relates to a method of managing a memory such as an electrically erasable programmable read only memory (EEPROM). Such a memory may be used, for example, in a smart card.

2. Brief Discussion of the Related Art

In such a memory, the stored elements are generally organized in a hierarchy (or tree structure), and it is known to manage said elements by means of an element allocation table and/or by means of pointers. The elements are then said to be physically chained relative to one another since each element corresponds to a physical address. This correspondence appears in the element allocation table, thereby making it possible in theory to find a looked-for element quickly. A drawback of using an element allocation table is that it occupies a fraction of the memory space that is no longer available for storing data. In addition, any change in the hierarchy of elements, such as move, a deletion, or a creation of an element, requires a corresponding modification to the element allocation table, and for a deletion also requires any elements that are descendants of the deleted element, themselves to be deleted. Such updating of the element allocation table slows down management of the elements and mobilizes computer means to which the memory is connected.

These drawbacks are particularly troublesome when the memory being managed is used in a smart card: the memory is of relatively small size and smart card readers have limited computer resources.

In addition, when the memory contains elements that are freely accessible and elements that are of access that is restricted solely to authorized people, a non-authorized person might attempt to access the restricted access elements by requesting the pointer to go to the address of a freely accessible element while disturbing the operation of the pointer (e.g. by subjecting it to a laser beam). There is then a risk of the disturbance bringing the pointer to a restricted access element without it being possible to verify correspondence between the requested address and the element reached.

It would therefore be advantageous to have a method of managing memory that does not have the above-mentioned drawbacks.

SUMMARY OF THE INVENTION

To this end, the invention provides a method of managing a memory comprising stored elements that are organized in a hierarchy, each having a header containing individual identity information and a body containing data, the identity information of each element being encoded on a plurality of bits each of which can take a first value or a second value, the identity information of each element being obtained by repeating the identity information of an element constituting a direct antecedent of the element in question in the hierarchy, and in said identity information of the antecedent, by changing the value of a first value bit that follows the last second value bit in a direction for reading identity information.

Thus, the identity information of an element enables the element to be identified and enables the antecedents of that element to be known. The element thus contains within itself the information that is necessary for situating it in the hierarchy of elements.

Preferably, the bits of the identity information of the highest element in the hierarchy are all first value.

It is then possible to have a maximum of elements identified by the method of the invention.

Advantageously, deletion of one of the elements from the memory is followed by the remaining elements being regrouped.

Since each element itself contains the information enabling it to be positioned in the hierarchy of elements, moving, deleting, or creating an element does not require any updating of an addressing table or of other elements, and can therefore be performed quickly and reliably. Regrouping the remaining elements can serve to accelerate access to these elements. This also makes it possible to recover memory space.

Other characteristics and advantages of the invention appear on reading the following description of a particular, non-limiting implementation of the invention.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

With reference to the figures, the memory given overall reference 1 is of the EEPROM type.

Figure 1:
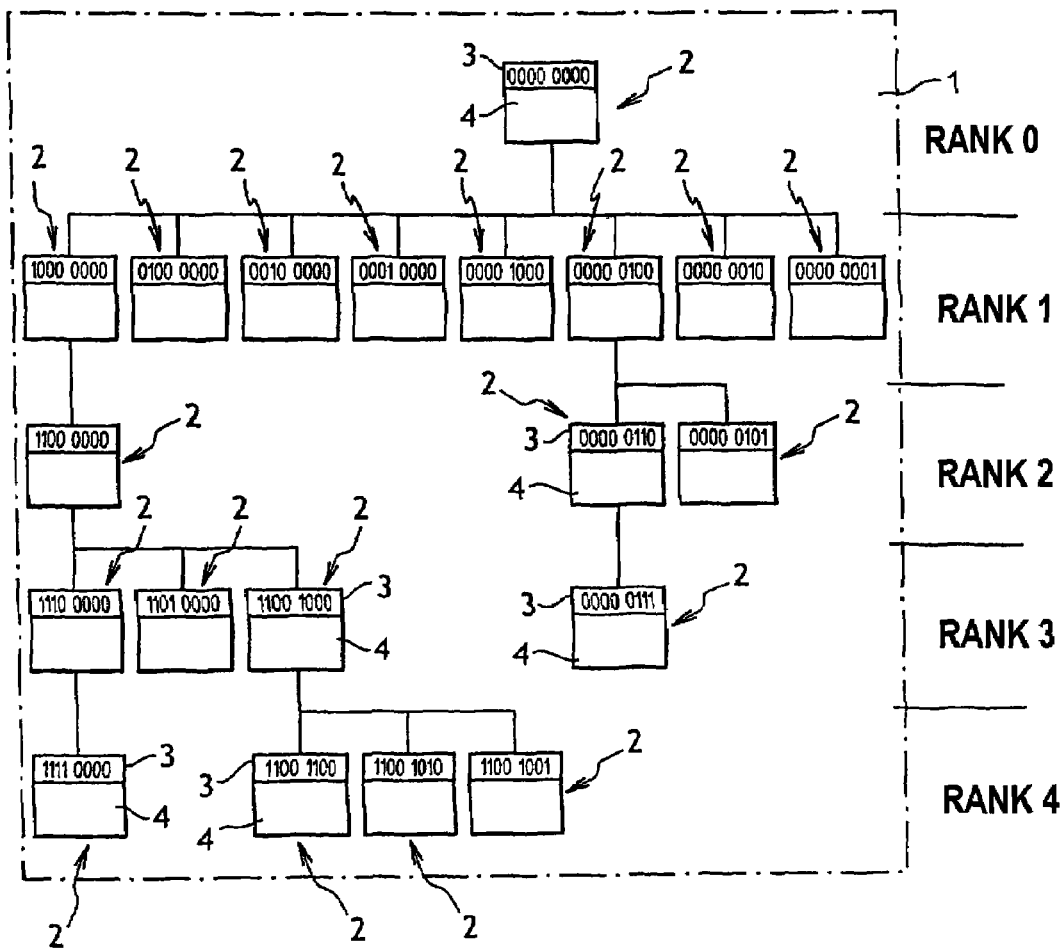
FIG. 1 is a diagrammatic view of the hierarchy of the memory managed in accordance with the method of the invention.

The memory 1 contains stored elements 2 organized in a hierarchy shown in FIG. 1. The term "stored element" is used to mean a directory type memory element, i.e. an element that can contain files. Each stored element has a header 3 containing individual identity information and a body 4 containing data.

The identity information of each element is encoded on a plurality of bits, each of which can take a first value or a second value. Specifically, the identity information is encoded on eight bits, each of which can take a value 0 or 1.

The highest element in the hierarchy in this implementation has the eight bits of its identity information set to 0.

The element 0000 0000 is the direct antecedent of eight elements, some of which are themselves the antecedents of other elements, and so on.

The identity information of each element is obtained by repeating the identity information of the element that constitutes a direct antecedent of the element in question in the hierarchy, and in said identity information of the antecedent, by changing the value of a 0 bit that follows the last 1 bit in a direction for reading identity information (in this implementation from left to right).

The descendants of the element 0000 0000 thus has the following identity information respectively: 1000 0000; 0100 0000; 0010 0000; 0001 0000; 0000 1000; 0000 0100; 0000 0010; and 0000 0001.

It will be understood that the number of 0 bits following the last 1 bit in the reading direction determines the number of descendants that an element can have. In this implementation, the hierarchy has a maximum of eight ranks and the memory has two hundred fifty-six elements.

Thus, the number of descendants that can belong to each of the elements: 1000 0000; 0100 0000; 0010 0000; 0001 0000; 0000 1000; 0000 0100; 0000 0010; and 0000 0001 are respectively: 7; 6; 5; 4; 3; 2; 1; and 0.

The element 1000 0000 (of rank 1) has three descendants in this implementation with the following respective identity information: 1100 0000; 1010 0000; and 1001 0000.

The element 1100 0000 (of rank 2) also has three descendants, with the following respective identity information: 1100 0000; 1101 0000; and 1100 1000. The element 1100 0000 may have three more descendants.

The element 1110 0000 (of rank 3) has one descendant with the identity information 1111 0000. The element 1110 0000 could have four other descendants.

The element 1100 1000 (of rank 3) also has three descendants having the following respective identity information: 1100 1100; 1100 1010; and 1100 1001. The numbers of descendants that each of these elements 1100 1100, 1100 1010, 1100 1001 can have are respectively 2, 1, and 0.

The element 0000 0100 (of rank 1) has two descendants in this implementation, having the following respective identity information: 0000 0110; and 0000 0101.

The element 0000 0110 (of rank 2) has (and can only have) one descendant, with identity information 0000 0111. The element 0000 0101 cannot have any descendants.

It will be understood that the number of 1 bits serves to determine the rank of an element in the hierarchy (element 0000 0000 being of rank 0). The last 1 bit in the reading direction serves to identify the element within its rank, whereas the preceding bit identifiers its direct antecedent (and thus all of its antecedents since each element reproduces the identity information of its direct antecedent).

Thus, on reaching the element 0000 0111, it is known that its successive antecedents are the elements: 0000 0110; 0000 0100; and 0000 0000.

Assuming that element 0000 0100 has access restricted to authorized people, it is easy to know that the element 0000 0111 is also of restricted access.

The lineage of an element is also easily identifiable. Thus, the descendants of the element 0010 0000 all have identity information beginning with the bit 001.

The method of the invention thus makes it possible to implement logical (as opposed to physical) chaining between the elements.

Figure 2:
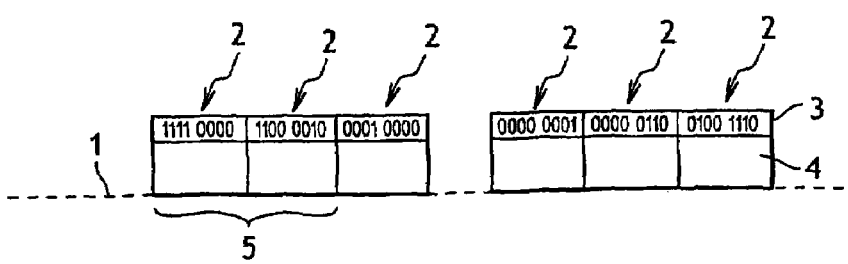
FIG. 2 is a fragmentary diagram of the memory, shown in linear form.

In FIG. 2, the memory 1 is represented in linear manner and includes a rapid access zone 5.

The method comprises the step of identifying at least one frequently accessed element 2 and of recording the frequently accessed element 2 in the rapid access zone 5. This does not raise any problem with the method of the invention since it suffices merely to move the elements 2 without updating the other elements or an addressing table.

In addition, deleting one of the elements 2, e.g. the element 0000 0001, from the memory 1 is followed by the remaining elements being regrouped: the elements 0000 0110 and 0100 1110 are then merely moved to be adjacent to the other elements.

The elements 2 therefore do not require to be organized physically in the memory 1, i.e. their physical locations in the memory are of no importance from the point of view of managing the memory (except when a zone of the memory has faster access, as described above). This simplifies and accelerates the operations of writing, moving, deleting, and creating elements.

Naturally, the invention is not limited to the implementation described but covers any variant coming within the ambit of the invention as defined by the claims.

In particular, the identity information may be encoded on some other number of bits. Thus, in the example described, the identity information is encoded on eight bits, but it could be encoded on a larger number of bits. In addition, the highest element need not have all of its bits at the same value, the highest element could have identity information 1111 1111 and its descendants could be 0111 1111, 1011 1111, 1101 1111, 1110 1111, and so on . . . .

The tree structure of the elements could be different from that described and the elements could have structures that are different.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of managing a memory comprising stored elements that are organized in a hierarchy, each having a header containing individual identity information and a body containing data, wherein the identity information of each element is encoded on a plurality of bits each of which can take a first value or a second value, and wherein the identity information of each element is obtained by repeating the identity information of an element constituting a direct antecedent of the element in question in the hierarchy and in said identity information of the antecedent, by changing the value of a first value bit that follows the last second value bit in a direction for reading the identity information.

2. The method according to claim 1, wherein the bits of the identity information of the highest element in the hierarchy are all first value bits.

3. The method according to claim 1, wherein deletion of one of the elements from the memory is followed by the remaining elements being regrouped.

4. The method according to claim 1, wherein the memory has a rapid access zone and the method includes the step of identifying at least one frequently accessed element and of recording the frequency access element in the rapid access zone.

* * * * *